3,300,448
POLYAMIDE OF ENHANCED DYEABILITY CONTAINING PHENYL PHOSPHONIC ACID AND N-AMINO ETHYL PIPERAZINE

Roger A. Gauthier, Jr., Pensacola, and Rupert J. Snooks, Jr., Gulf Breeze, Fla., assignors to Monsanto Company, a corporation of Delaware
No Drawing. Filed Sept. 9, 1963, Ser. No. 307,321
4 Claims. (Cl. 260—78)

This invention relates to the preparation of nylon polymers having enhanced ability to receive dyes. More particularly, this invention relates to nylon–66 polymer containing certain additives which render the polymer more receptive to dyes and to a method of making such polymer, as well as to a method of shaping such polymer into textile structures and the like.

Yarns made from nylon–66 polymer have gained wide acceptance in the textile trade because of their many desirable physical properties. As is well known, nylon–66 is prepared commercially by polycondensing adipic acid and hexamethylenediamine. The resulting polymer does not have as good a dye affinity as some of the other specific nylon polymers. Therefore, in order to increase the utility of nylon–66 as a more general purpose filamentary material, much research effort has been conducted to improve the dye affinity of nylon–66 polymer. To this end, certain chemical additives have been incorporated therein.

It has been disclosed previously that phenyl phosphinic acid and certain derivatives thereof render nylon–66 more deeply dyeable. Unfortunately, the use of such additives results in several economic disadvantages in the manufacture of filaments melt-spun therefrom. For example, when nylon–66 containing hexamethylene diammonium phenylphosphinate as a polymer additive for the accomplishment of deeper dyeing is melt spun into filaments, excessive foaming and increased processing time in the polymer forming stage are experienced. Furthermore, it has been observed that in the formation of filaments there is a greater tendency for buildup of polymeric incrustations around the peripheries of the orifices in the spinneret. The presence of such incrustations gives rise to a very bothersome spinning problem referred to as spinneret drips. In addition, yarn melt spun from nylon–66 containing the phenylphosphinate compound has poor drawing performance in that breakage of the individual filaments and complete threadline, as well as extraneous wraps around the draw roll, is experienced during the molecular orientation of the yarn.

It has been observed that N-aminoethyl piperazine when added to nylon–66 increases the depth to which such polymer can be colored by acid dyes. Unfortunately, the making of nylon–66 polymer containing the piperazine compound alone and the forming of filaments give rise to certain notable disadvantages, i.e., increased spinneret drips, poor drawing performance, reduced tenacity and severe discoloration of yarn melt spun therefrom. Obviously, it would be desirable to maintain the increased dyeing depth of nylon–66 polymer containing the aforesaid additives individually without the attending processing problems.

It is an object of the present invention to provide a new and useful nylon–66 polymer having improved depth of dyeing.

It is another object to provide a new and useful nylon–66 polymer having improved dyeability by the presence therein of a combination of additives.

It is a further object to provide a structure shaped from nylon–66 polymer having increased dye affinity by the presence therein of a combination of additives.

It is yet another object to provide a method of preparing nylon–66 polymer capable of being dyed deeper.

It is still another object to provide a method of preparing improved deeper dyeing nylon–66 textile yarn.

The objects of this invention are accomplished by incorporating in nylon–66 a particular binary dye-enhancing combination of additives. The combination comprises a small amount of phenylphosphinic acid and a small amount of N-aminoethyl piperazine, particularly N-(2-aminoethyl) piperazine. The nylon is prepared by forming a mixture of a nylon-forming monomeric component and the particular dye-enhancing combination of additives and by thereafter heating the resulting mixture at nylon-forming temperatures for a sufficient time to polycondense the nylon-forming component to the desired degree of polycondensation. The nylon-forming component ordinarily is the salt of hexamethylenediamine and adipic acid. The resulting nylon–66 polymer is worked or shaped into textile structures or the like by conventional procedures.

The amount of phenylphosphinic acid incorporated in the nylon polymer is usually about 0.2–1.0 percent, based on the weight of the resultant nylon polymer. By employing the phosphinic compound much below 0.2 percent, one does not obtain the desired increase in dye-depth of the polymer. Not substantially exceeding 1.0 percent phenylphosphinic acid in the additive system enables one to avoid excessive foaming in the polymer forming stage. A more preferred concentration of the phosphinic compound is in the range of 0.3–0.5 weight percent.

The amount of N-aminoethyl piperazine incorporated in the nylon polymer generally will be in the same ranges specified for the phosphinic compound. That is to say, the amounts of piperazine compound ordinarily will be about 0.2–1.0 percent based on the weight of the polymer with the preferred amounts ranging from 0.3–0.5 percent. By employing the piperazine compound in an amount much below 0.2 percent, one does not obtain the desired increase in dye depth of the polymer. Not substantially exceeding 1.0 percent piperazine compound in the additive system enables one to avoid excessive spinneret drips.

It has been found that best results are obtained when both additives are present in approximately equal amounts, preferably in the amount of about 0.38 weight percent. To insure obtaining the advantages of the present invention it is best not to add one of the components in an amount exceeding twice the amount of the other component. It is quite surprising that with the employment of the binary additive system herein, one not only obtains a deeper dyeing polymer but obviates the difficulties experienced in manufacturing yarns from nylon–66 polymers containing only one of these additives. By following the present invention, one encounters less foaming of the polymer and reduced spinneret drips and obtains considerably better drawing performance of yarn made from the modified nylon–66 polymer.

The most useful nylon–66 polymers obtained are high molecular weight materials having an intrinsic viscosity of 0.4 or above. The high molecular weight nylon having an intrinsic viscosity of 0.7–1.3 advantageously can be formed into textile-grade filaments, fibers, films and the like.

Intrinsic viscosity can be ascertained by first determining the specific viscosities of a series of solutions of the nylon polymer. Then, these data are plotted on a graph and the intrinsic viscosity calculated therefrom. Specifically, a series of polymer solutions are prepared in concentrations, for example, of 0.1, 0.2, 0.3, 0.4 and 0.5 percent by weight. A 100 series viscometer tube is used; and the efflux time in seconds at 25° C. is determined for each solution and the solvent employed. Specific viscosity is then determined as follows:

$$N_{sp} = \frac{\text{efflux time of solution}}{\text{efflux time of solvent}} - 1$$

A graph is made in which $N_{sp}$/percent concentration is plotted against percent concentration. A straight line is drawn through the points. By extrapolating the line to zero concentration, the intrinsic viscosity is determined, i.e., the point at which the extrapolated line crosses the $N_{sp}$/percent concentration axis is taken as the intrinsic viscosity.

The binary combination of dye-enhancing additives can be incorporated in nylon-66 in various ways. One preferred way is to admix the ingredients of the combination of additives with nylon-66 salt before polycondensation. However, incorporation of the additives together or separately to the nylon-forming reactants at any time during the polycondensation can be made.

The nylon polymer having the combination of dye-enhancing additives incorporated therein can be shaped or worked into various forms. For example, the polymer can be melt spun into yarns, bristles, filaments, films and the like. Articles can be molded from the nylon; and surfaces can be coated therewith.

For a more detailed description of the present invention, reference is made to the following specific examples. The examples are intended merely to be illustrative and not limitative. All parts and percentages used therein are by weight unless otherwise indicated.

*Example I*

First, an aqueous solution of hexamethylene diammonium phenylphosphinate was prepared. To do this, hexamethylenediamine was gradually mixed with an aqueous solution containing 25.3 weight percent benzene phosphinic acid in an amount sufficient to raise the pH of the solution to 6.3.

A stainless steel autoclave adapted for batch polycondensation of nylon-66 was filled with nitrogen gas and was thereafter charged with an aqueous solution containing 75 percent by weight of the adipic acid salt of hexamethylenediamine (nylon-66 salt). The temperature of the charge was 150° C., and the pressure in the autoclave was 150 p.s.i.g. Immediately after the salt charge was completed an amount of the prepared hexamethylene diammonium phenylphosphinate was added to the autoclave such that the ultimate polymer had about 0.75 percent additive.

The contents in the autoclave then were heated quickly to a temperature of 200° C. under 250 p.s.i.g. pressure at which time a small amount of an aqueous slurry containing 30 weight percent TiO$_2$ delustrant was added such that the ultimate polymer contained 0.3 percent TiO$_2$. Heating of the contents was continued until the nylon-forming material in the autoclave reached a temperature of 243° C. At this stage bleeding off of water vapor was begun to reduce the pressure in the autoclave to atmospheric pressure. During this pressure reduction the polymer temperature gradually was increased to 270° C. Upon completion of the polycondensation reaction, the polymer was extruded in the form of a ribbon onto a casting wheel where it was quenched with water. Thereafter, the ribbon was cut into chips suitable for forming into filaments by the use of a heated grid spinning apparatus.

Polymer waste due to discoloration and formation of foam during the extrusion of the polymer averaged 2.8 percent. On the other hand, waste for like polymer not containing the phosphinate additive averaged 0.5 percent.

The nylon chips containing the additive were then melted in a steam atmosphere in a grid spinning apparatus and spun by conventional melt spinning into a 70 total denier 34 filament yarn at a take-up rate of 1600 y.p.m. Spinning was continued for two weeks. The formation of spinneret drips was observed and compared to those observed when yarn not containing the phosphinate additive was produced. During the spinning of polymer containing the additive 18 spinneret drips per machine day were observed whereas during spinning of polymer with no additive only 3 spinneret drips per machine day were observed.

The substantially unoriented yarn containing the phosphinate additive was then cold drawn and taken up in package form using a conventional draw-twisting machine. The draw ratio employed was 2.4. Drawing performance of this yarn was observed and compared to similar yarn containing no phosphinate additive. Results showed that the test yarn had 0.13 breaks and wraps per pound while the control yarn exhibited only 0.035 breaks and wraps per pound.

This example illustrates the inferior polymer spinning and draw-twisting performance of yarn containing a small amount of hexamethylene diammonium phenylphosphinate to enhance the dyeability thereof.

The yarn containing the additive was knitted into tricot and circular knit fabrics. These fabrics were scoured and dyed in acid, dispersed, and premetallized dyes. The results of the dyeings showed significantly increased dye rates of the additive-containing yarn with the acid and premetallized dyes with essentially no change in dispersed dye rates.

*Example II*

The aqueous solution of the adipic acid salt of hexamethylenediamine was polycondensed following the procedure of Example I adding an aqueous solution containing 13.6 weight percent phenylphosphinic acid and a second aqueous solution containing 13.6 weight percent N-(2-aminoethyl) piperazine in an amount such that the ultimate polymer had equal amounts of each additive and a total additive content of 0.75 weight percent. Also, the same amount of TiO$_2$ as used in Example I was added during polycondensation. Chips of the resulting nylon were formed as described in the first example. Foaming and discoloration of the polymer at the end of the extrusion cycle were observed to be virtually eliminated by the use of the combination of additives with no more polymer waste than that of the nylon polymer containing no additive.

The nylon chips of this example were then melted in a steam atmosphere and spun into a 70 denier 34 filament yarn by the use of a heated grid spinning apparatus at a take-up rate of 1500 y.p.m. Spinning was continued for a period of three days. The frequency of spinneret wipes was the same as that of Example I. No drips occurred during the three days that polymer of this example was spun into yarn.

The undrawn yarn was then given an orientation stretch of 2.74 times. Drawing performance of this yarn was much superior to yarn containing hexamethylene diammonium phenylphosphinate additive alone in that only 0.090 breaks and wraps per pound of yarn on the average were experienced.

It can be seen from this example that the combination of substantially equal amounts of phenylphosphinic acid and N-aminoethyl piperazine significantly improves deep-dye nylon-66 polymer formation and drawtwist performance of yarn made therefrom.

The yarn of this example and the yarn of Example I containing only the phosphinate additive were knitted into tricot fabrics. When both fabrics were dyed using acid, dispersed and premetallized dyes, it was found that the fabrics exhibited comparable dye depths. The yarn of this example also exhibited increased strength and elongation retention after being exposed for 120 hours in a device for measuring color deterioration of dyed fabric when exposed to a light. Also, less color breaking was observed for the fabric made of the yarn of this example dyed with Anthraquinone Blue SWF and exposed in the device for 80 hours.

*Example III*

Polymer chips were prepared using the procedure of Example I. In this instance an aqueous solution containing 13.6 weight percent of phenylphosphinic acid and a second aqueous solution containing 13.6 weight percent of N-(2-aminoethyl) piperazine were employed in equal amounts to enhance the dyeability of the resulting polymer. The total amount of these additives based on the weight of the polymer was 0.75 percent. The thus-produced chips were melt spun into 4 denier 13 filament yarn at a take-up rate of 1300 y.p.m. Substantially the same reduction of polymer foam and reduced frequency of spinning drips as in Example II were observed.

*Example IV*

Polymer chips were prepared following the procedure of Example I and employing an aqueous solution containing 18.2 weight percent of phenylphosphinic acid (0.50 percent based on the weight of polymer) and a second aqueous solution containing 9.1 weight percent of N-(2-aminoethyl) piperazine (0.25 percent based on the weight of the polymer) as the dye-enhancing combination of additives. The chips were melt spun into 40 denier 13 filament yarn at a take-up rate of 1500 y.p.m. Substantially the same reduction in polymer foam and reduced frequency or spinneret drips as obtained in Example II were observed.

Similar improvements were found when nylon polymer containing the combination of additives of the present invention was made employing conventional continuous polymerization apparatus including an evaporator, reactor, flasher and finisher.

Thus, it is seen that the present invention provides numerous advantages. Among these is the imparting of deeper dyeing characteristics to nylon yarn. By the use of the combination of additives herein, one is able to utilize the dye-enhancing property of phenylphosphinic acid with less loss of polymer due to foam formation and polymer deterioration. In addition, drawing performance of the yarn is greatly improved as compared to yarn containing only hexamethylene diammonium phenylphosphinate.

As many different embodiments of this invention can be made without departing from the spirit and scope thereof, it is to be understood that the invention is not limited to the above disclosed specific embodiments except as defined in the following claims.

What is claimed is:

1. A polyhexamethylene adipamide filament made more deeply dyeable by having incorporated therein on a weight basis about 0.2–1.0 percent phenylphosphinic acid and about 0.2–1.0 percent N-(2-aminoethyl) piperazine.

2. A polyhexamethylene adipamide filament made more deeply dyeable by having incorporated therein on a weight basis about 0.2–1.0 percent phenylphosphinic acid and about 0.2–1.0 percent N-(aminoethyl) piperazine.

3. A polyhexamethylene adipamide filament made more deeply dyeable by having incorporated therein on a weight basis 0.3–0.5 percent phenylphosphinic acid and 0.3–0.5 percent N-(2-aminoethyl) piperazine.

4. A polyhexamethylene adipamide filament made more deeply dyeable by having incorporated therein on a weight basis 0.38 percent phenylphosphinic acid and 0.38 percent N-(2-aminoethyl) piperazine.

References Cited by the Examiner

UNITED STATES PATENTS

| | | | |
|---|---|---|---|
| 2,324,936 | 7/1943 | Krolper et al. | 260—78 |
| 2,359,833 | 10/1944 | Faris | 260—78 |
| 3,235,534 | 2/1966 | Brinkman et al. | 260—78 |

WILLIAM H. SHORT, *Primary Examiner.*

H. D. ANDERSON, *Assistant Examiner.*